United States Patent
Aweya et al.

(10) Patent No.: US 7,787,370 B1
(45) Date of Patent: Aug. 31, 2010

(54) TECHNIQUE FOR ADAPTIVELY LOAD BALANCING CONNECTIONS IN MULTI-LINK TRUNKS

(75) Inventors: James Aweya, Nepean (CA); Michel Ouellette, Plantagenet (CA); Delfin Y. Montuno, Kanata (CA); Kent Felske, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 2440 days.

(21) Appl. No.: 09/946,736

(22) Filed: Sep. 6, 2001

(51) Int. Cl.
*G01R 31/08* (2006.01)
(52) U.S. Cl. .................. 370/230; 370/232; 370/235; 370/252; 370/253
(58) Field of Classification Search .......... 370/229, 370/230, 230.2, 235, 236, 412, 413, 415, 370/468, 465, 252, 253; 709/105; 718/105
See application file for complete search history.

(56) References Cited

U.S. PATENT DOCUMENTS

| | | | | |
|---|---|---|---|---|
| 4,276,643 A * | 6/1981 | Laprie et al. | ............... | 370/351 |
| 5,583,792 A * | 12/1996 | Li et al. | ............... | 709/224 |
| 5,617,417 A * | 4/1997 | Sathe et al. | ............... | 370/394 |
| 5,687,167 A * | 11/1997 | Bertin et al. | ............... | 370/254 |
| 6,049,528 A * | 4/2000 | Hendel et al. | ............... | 370/235 |
| 6,078,957 A * | 6/2000 | Adelman et al. | ............... | 709/224 |
| 6,160,808 A * | 12/2000 | Maurya | ............... | 370/389 |
| 6,195,354 B1 * | 2/2001 | Skalecki et al. | ............... | 370/395.32 |
| 6,252,848 B1 * | 6/2001 | Skirmont | ............... | 370/229 |
| 6,333,917 B1 * | 12/2001 | Lyon et al. | ............... | 370/236 |
| 6,359,879 B1 * | 3/2002 | Carvey et al. | ............... | 370/351 |
| 6,360,335 B1 * | 3/2002 | Dawson | ............... | 714/39 |
| 6,496,502 B1 * | 12/2002 | Fite et al. | ............... | 370/389 |
| 6,529,499 B1 * | 3/2003 | Doshi et al. | ............... | 370/352 |
| 6,556,578 B1 * | 4/2003 | Silberschatz et al. | ............... | 370/412 |
| 6,563,806 B1 * | 5/2003 | Yano et al. | ............... | 370/330 |
| 6,574,195 B2 * | 6/2003 | Roberts | ............... | 370/235 |
| 6,577,595 B1 * | 6/2003 | Counterman | ............... | 370/230 |
| 6,591,303 B1 * | 7/2003 | Hendel et al. | ............... | 709/238 |
| 6,594,268 B1 * | 7/2003 | Aukia et al. | ............... | 370/400 |
| 6,606,301 B1 * | 8/2003 | Muller et al. | ............... | 370/230 |
| 6,646,988 B1 * | 11/2003 | Nandy et al. | ............... | 370/235 |
| 6,647,008 B1 * | 11/2003 | Galand et al. | ............... | 370/389 |
| 6,661,775 B1 * | 12/2003 | Nakayama et al. | ............... | 370/230.1 |
| 6,675,220 B1 * | 1/2004 | Bergamasco et al. | ............... | 709/232 |
| 6,724,722 B1 * | 4/2004 | Wang et al. | ............... | 370/229 |

(Continued)

OTHER PUBLICATIONS

C. B. S. Traw and J. M. Smith, "Striping within the Network Subsystem," IEEE Network, Jul./Aug. 1995, pp. 22-32.

(Continued)

*Primary Examiner*—Salman Ahmed
*Assistant Examiner*—Andrew C Lee
(74) *Attorney, Agent, or Firm*—Hunton & Williams, LLP

(57) ABSTRACT

A technique for adaptively load balancing connections in multi-link trunks is disclosed. The present invention provides an adaptive load balancing algorithm that utilizes relative link quality metrics to adjust traffic distribution between links. Link quality metrics may include short-term averages of an observed packet drop rate for each member link in a bundle. The present invention may dynamically adjust the number of flows on each link in proportion to available bandwidth. In addition, link quality metrics may be equalized, such that no link is more lossy than the others.

15 Claims, 9 Drawing Sheets

U.S. PATENT DOCUMENTS

| | | | |
|---|---|---|---|
| 6,731,599 B1* | 5/2004 | Hunter et al. | 370/229 |
| 6,744,767 B1* | 6/2004 | Chiu et al. | 370/395.21 |
| 6,760,313 B1* | 7/2004 | Sindhushayana et al. | 370/252 |
| 6,778,495 B1* | 8/2004 | Blair | 370/230 |
| 6,795,399 B1* | 9/2004 | Benmohamed et al. | 370/235 |
| 6,804,233 B1* | 10/2004 | Congdon et al. | 370/389 |
| 6,904,017 B1* | 6/2005 | Meempat et al. | 370/238 |
| 6,909,693 B1* | 6/2005 | Firoiu et al. | 370/235 |
| 6,931,017 B2* | 8/2005 | McGowan | 370/401 |
| 6,934,256 B1* | 8/2005 | Jacobson et al. | 370/235 |
| 6,961,307 B1* | 11/2005 | Aweya et al. | 370/230 |
| 6,970,420 B1* | 11/2005 | Kalkunte et al. | 370/230 |
| 6,977,892 B2* | 12/2005 | Kalkunte et al. | 370/230 |
| 6,977,932 B1* | 12/2005 | Hauck | 370/392 |
| 6,996,062 B1* | 2/2006 | Freed et al. | 370/235 |
| 6,996,615 B1* | 2/2006 | McGuire | 709/226 |
| 7,120,124 B2* | 10/2006 | Kawasaki et al. | 370/252 |
| 7,184,402 B1* | 2/2007 | Sharma et al. | 370/232 |
| 7,218,608 B1* | 5/2007 | Fang et al. | 370/229 |
| 2002/0051458 A1* | 5/2002 | Carvey et al. | 370/401 |
| 2002/0054567 A1* | 5/2002 | Fan | 370/230 |
| 2003/0028670 A1* | 2/2003 | Lee et al. | 709/241 |

OTHER PUBLICATIONS

A. Hari, G. Varghese, and G. Parulkar, "An Architecture for Packet-Striping Protocol," ACM Trans. on Computer System, vol. 17. No. 4, Nov. 1999, pp. 249-287.

IEEE Std 802.3ad-2000, pp. 1-172.

K. Sklower, B. Lloyd, G. McGregor, D. Carr, and T. Coradetti, "The PPP Multilink Protocol (MP)," rfc 1990, Aug. 1996, pp. 1-24.

The ATM Forum, Inverse Multiplexing for ATM (IMA) Specification, Version 1.1, ATM Forum Doc. AF-PHY-0086.001, 1999, pp. 1-185.

S. Floyd and V. Jacobson, "Radom Early Detection Gateways for Congestion Avoidance." IEEE/ACM Trans. Networking, vol. 1, No. 4, Aug. 1993, pp. 397-413.

B. Braden et al., "Recommendation on Queue Management and Congestion Avoidance in the Internet," IETF RFC 2309, Apr. 1998, pp. 1-17.

J. Aweya, D. Y. Montuno, and M. Ouellette. "Method and Apparatus for Active Queue Management Based on Desired Queue Occupancy," Filed to the U.S. Patent and Trademark Office, U.S. Appl. No. 09/455,445. Dec. 1999. Assignee: Nortel Networks.

* cited by examiner

TECHNIQUE FOR ADAPTIVELY LOAD BALANCING CONNECTIONS IN MULTI-LINK TRUNKS

CROSS-REFERENCE TO RELATED APPLICATIONS

This patent application is related to U.S. patent application Ser. No. 09/455,445, filed Dec. 6, 1999, which is hereby incorporated by reference herein in its entirety.

FIELD OF THE INVENTION

The present invention relates generally to adaptive load balancing algorithms and, more particularly, to a technique for adaptively load balancing connections in multi-link trunks.

BACKGROUND OF THE INVENTION

For link aggregation trunks to work effectively, load distribution among the links must be as balanced as possible. Multi-link trunking provides access pipes to servers where data is concentrated. As the deployment of sophisticated applications such as intranets, groupware, Web-based applications, and document imaging place new demands on network performance, multi-link load balancing delivers faster response times to user data requests by minimizing bottlenecks at a server. While other system components also impact performance, server interfaces with multi-link load balancing provide dramatic improvements in throughput at a relatively low cost.

In addition to flexibility, multiple links provide higher availability and resiliency as well as improved fault tolerance. The resiliency provided by load balancing provides high-availability network paths, which are increasingly important as more and more mission-critical and other applications are deployed in networks.

Although multi-link trunking has many benefits, a major challenge is how to distribute and balance traffic across various links. An effective load balancing scheme will result in a full utilization of invested resource and maximize available performance. Current load balancing solutions have a number of limitations. They often fail to provide fair bandwidth allocation, or introduce significant reordering of packets. Transport protocols, such as Transmission Control Protocol (TCP), require reasonable limits on packet reordering and loss in order to function optimally. For example, a fast retransmit algorithm makes assumptions about a level of packet reordering, and induces spurious retransmissions in the face of excessive reordering. It is therefore important to ensure that any multi-link load balancing scheme limits packet reordering and loss as much as possible.

Various algorithms have been proposed for scheduling traffic in multi-link trunks, such as random packet load balancing, round-robin packet load balancing, random flow load balancing, round-robin flow load balancing, and address-based load balancing, for example.

With random packet load balancing, as packets arrive at a multi-link trunk, the packets are randomly distributed, packet-by-packet over each link. This provides a simple load balancing implementation but has a number of drawbacks. For example, random fluctuations in traffic can result in each link being loaded differently. As a result, the performance of the system is hard to predict. Also, packets within a flow or session may arrive at their destination out of order (e.g., mis-sequenced). Out of order delivery may result in TCP clients retransmitting packets thereby adding to network load. When a TCP receiver receives a segment with an out-of-order sequence number value, the receiver is required to generate an immediate acknowledgment (ACK) of the highest in-order data byte received (e.g., a duplicate ACK of an earlier transmission). The purpose of the duplicate ACK is to inform the sender that a segment was received out of order, as well as the sequence number expected. When the TCP sender receives three duplicate ACKs, it immediately retransmits the lost segment.

A round-robin packet load balancing approach distributes each arriving packet on a different link in a round-robin fashion. This means that each link is used on a rotating basis for each arriving packet. This scheme is simple to implement with little processor overhead. However, the round-robin packet load balancing approach fails to provide adequate bandwidth allocation in the presence of variable packet sizes. Also, since packets for a given session go out on different links, the packets may reach their destination out of order. For TCP, this can force clients to retransmit packets thereby resulting in increased traffic and a loss of performance. Weighted round robin load balancing is similar to round robin, but each link in the trunk is assigned a static weight based on some view of the capacity of the link. Packets are forwarded to the links in proportion to their weighting. More sophisticated round-robin packet schemes that can handle variable packet sizes and provide fair load sharing over links having different capacities are available.

With a random flow load balancing approach, each new flow or session (e.g., TCP connection) is randomly assigned to a link. Thus, all packets in the flow follow the same path. The scheme is simple to implement and does not result in misordering of packets within a flow. However, random fluctuations in traffic can cause each link to be loaded differently. As a result, it is hard to predict system performance in this case.

A round-robin flow load balancing approach distributes each new flow on a different link in a round-robin fashion. Although this method preserves packet sequencing, random fluctuations in traffic in the connections can cause each link to be loaded differently. It is also difficult to predict system performance in this case.

Typically, address-based load balancing schemes select a link on which a packet is to be transmitted based on the result of a hashing mechanism that uses one or more identifiers in the packet. Typically, simple algorithms may include hashing of a destination medium access control (MAC) address, or hashing of a flow identifier, etc. to designate a link to each flow.

Another conventional method involves using an exclusive-OR (X-OR) operation to determine what link in the trunk will be taken by an arriving packet. For a four-link trunk, a X-OR operation can be performed on the last two lowest-order bits of the source and destination MAC addresses. This operation yields one of four results: ((0 0), (0 1), (1 0), or (1 1). Each of these values points to a link in the bundle. In the case of a two-link trunk, only a single bit is used in the X-OR operation. This scenario yields two possible results, each pointing to a link in the bundle. The X-OR operations result in the sequencing of packets and, if the destination also performs the same operation, the same link is taken because the X-OR operation results in the same value in both directions. There are circumstances where one address in a source-destination pair is a constant. For example, a destination might be a server or, even more likely, a router. However, as long as one address (source or destination) is different, there is still a chance of statistical load balancing. If the two addresses are constant as would be the case and/or if the traffic is between two routers (or two servers), then no load balancing exists. Although this method preserves packet sequencing, random fluctuations in traffic in the connections can cause each link to be loaded differently. It is also hard to predict the system performance in this case.

Other methods use only a destination MAC address where the link selected is based on low-order bits of the MAC address. A disadvantage of this method is that server traffic may not be evenly balanced across all links, since this method depends on destination address distribution of the clients. Another drawback, particularly in an Ethernet MAC address-based scheme, is that all clients lying across a router will be assigned to the same link, since they all contain the same destination MAC address—which is the router's MAC address. In this case, the traffic will not be load balanced thereby creating major problems for a typical IP network, in which at least one router can be found between most clients and servers.

Multi-link trunking provides various benefits. For example, multi-link trunking protects investments in existing infrastructure. It further provides a cost effective solution for applications which need incremental scaling. For example, multi-link trunking supports incremental scaling rather than exponential scaling of server and switch ports. Also, it allows for quick performance upgrades before procurement of new hardware, where point-to-point carrying capacity of a link may be scaled according to a desired bandwidth.

Currently, it may be more cost effective to trunk multiple lower speed links. This is because traditional end-systems do not fully utilize a high bandwidth link (e.g., a 1 Gbps link), available copper links and supported distances are more pervasive for lower speed links, and lower speed network interface cards (NICs) and switch ports are more affordable.

Multi-link load balancing technology is of growing importance as network managers and designers seek to upgrade the performance and availability of existing infrastructures as inexpensively and efficiently as possible. Multi-link load balancing on several lower capacity links (e.g., 10, 100 Mbps) provides a cost-effective way to expand (e.g., server-to-switch, switch-to-switch) link bandwidth to relieve congestion before making a transition to higher capacity single links (e.g., 1, 10 Gbps).

In view of the foregoing, it would be desirable to provide a technique for adaptively load balancing connections in multi-link trunks which overcomes the above-described inadequacies and shortcomings. More particularly, it would be desirable to provide a technique for adaptively load balancing connections in multi-link trunks in an efficient and cost effective manner.

SUMMARY OF THE INVENTION

According to the present invention, a technique for adaptively load balancing connections in multi-link trunks is provided. In one embodiment, the present invention relates a method for adaptively load balancing connections in a multi-link trunk in a network having a plurality of network nodes comprising the steps of determining at least one relative link quality metric for each link in the multi-link trunk; detecting an arrival of a connection at a network node; and assigning the connection to a link based on the relative link quality metric of the link.

In accordance with other aspects of the present invention, the method may further comprise the steps of computing at least one packet drop probability for each link; filtering the packet drop probability; computing a link weight for each link; normalizing each link weight for each link; and determining a probability range for each link. The step of assigning the connection to a link may further comprise the steps of generating a random number; associating each random number to a link; and sending the connection to the link. Additional steps may further include the step of deciding to drop an incoming packet at a link queue; computing at least one packet drop probability for each link; generating a random number; and comparing the random number to the packet drop probability. The method may further comprise the step of computing an inter-drop interval for determining an interval at which to drop a packet.

According to yet another aspect of the present invention, an apparatus for adaptively load balancing connections in a multi-link trunk in a network having a plurality of network nodes comprises a queue management algorithm for determining at least one relative link quality metric for each link in the multi-link trunk; a detector for detecting an arrival of a connection at a network node; and a load balancing algorithm for assigning the connection to a link based on the relative link quality metric of the link.

According to yet another aspect of the present invention, a computer signal embodied in a carrier wave readable by a computing system and encoding a computer program of instructions for executing a computer process performs a method for adaptively load balancing connections in a multi-link trunk in a network having a plurality of network nodes, the method comprising the steps of determining at least one relative link quality metric for each link in the multi-link trunk; detecting an arrival of a connection at a network node; and assigning the connection to a link based on the relative link quality metric of the link.

According to yet another aspect of the present invention, an article of manufacture for adaptively load balancing connections in a multi-link trunk in a network having a plurality of network nodes comprises at least one processor readable carrier; and instructions carried on the at least one carrier; wherein the instructions are configured to be readable from the at least one carrier by at least one processor and thereby cause the at least one processor to operate so as to determine at least one relative link quality metric for each link in the multi-link trunk; detect an arrival of a connection at a network node; and assign the connection to a link based on the relative link quality metric of the link.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

Figure 1:
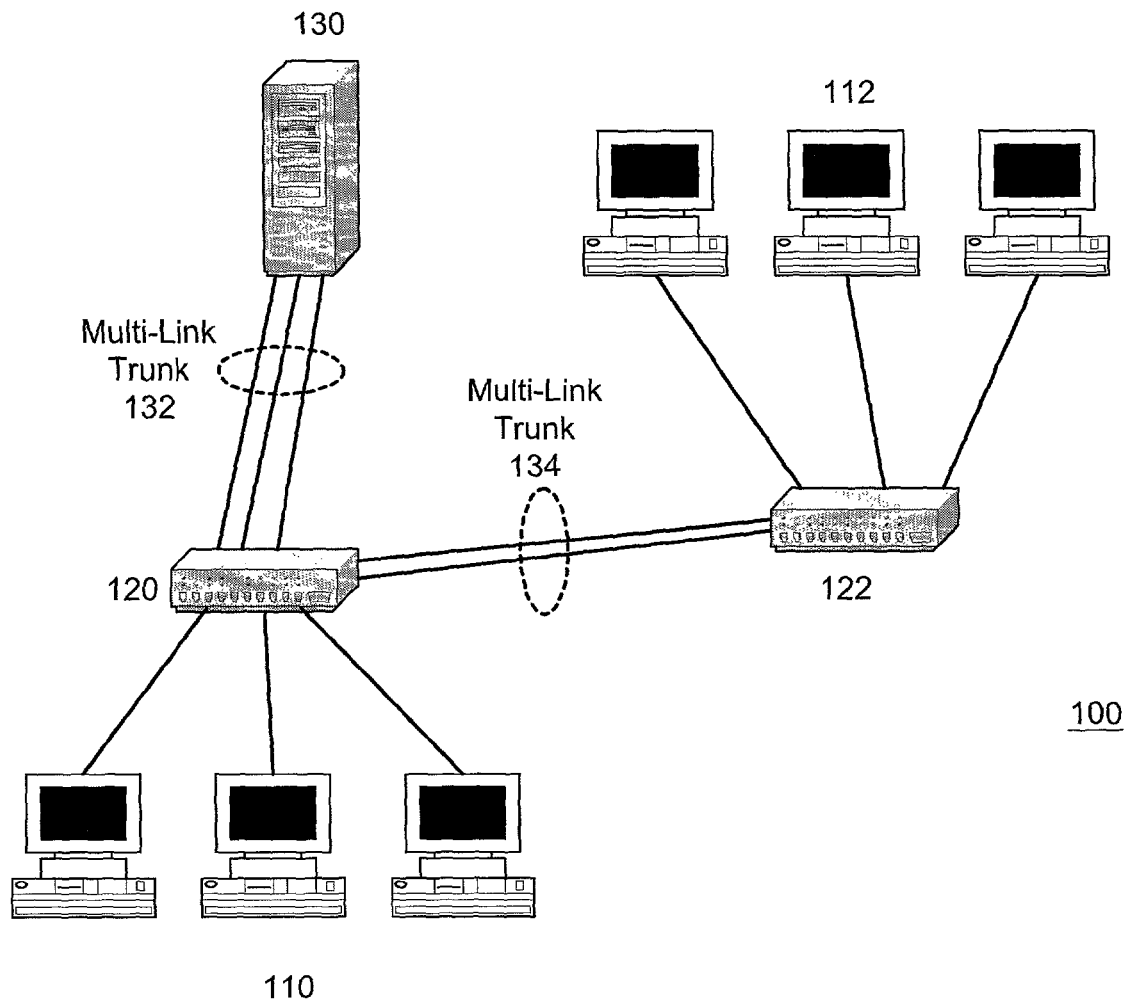
FIG. 1 is an example of a multi-link trunking system, in accordance with the present invention.

The present invention provides a load balancing algorithm for multi-link trunks. Multi-link trunking involves a technology that allows multiple physical links to be bundled together and be treated as a single logical link. The technology provides various advantages, such as incremental bandwidth, simple migration strategy, low cost, low complexity, and extension life of older equipment. For example, multi-link trunking allows parallel physical links between switches or between a switch and a server to be used simultaneously, multiplying the bandwidth between the devices.

The load balancing algorithm of the present invention may implement relative link quality metrics (e.g., the short-term averages of the observed packet drop rate for each of the member links in a bundle) to adjust the traffic distribution among links. The present invention further dynamically adjusts the number of flows on each link in proportion to relative data carrying capacity. The algorithm of the present invention provides that all links are utilized as much as possible in proportion to available buffering and bandwidth. Further, no single link (or a minimal number of links) is more lossy than the others.

The technique of the present invention implicitly balances the number of flows, such as TCP connections, in the links by balancing loss rates, as loss rates depend on the number of TCP connections. As a result, multi-link trunks may be deployed with high throughput and minimal loss.

Multi-link trunking involves aggregating link capacity by a parallel connection of several links between two end points. An advantage of multi-link trunks includes the ability to load balance traffic across different links. The present invention provides a method and system for load balancing TCP sessions in multi-link trunks based on minimizing loss rates while maximizing utilization on links.

The present invention involves determining availability of each link of the trunk. Upon arrival of a new traffic flow, a link is determined based on the availability of each link. The availability of a link may be computed based on an amount of loss experienced by the link. For example, a link with zero loss will have a high availability value as opposed to a link with non-zero loss.

Availability values may be normalized such that the sum of these values is equal to one. The availability values may form subintervals in an interval having a value of one, for example. When a new flow arrives, a random number between zero and 1 (or other predetermined range) is generated. This random number may be associated with one of the availability subintervals thereby indicating a specific link to use.

The present invention provides a load balancing scheme for multi-link trunks which uses relative link performance metrics to adjust traffic scheduling across bundled links. By utilizing link loss rate information, relative short-term availability metrics may be computed. These short-term metrics may then be used to schedule TCP flows across the links such that a throughput of the system may be maximized and the delay of packets can be controlled.

Limited bandwidth of current wide-area networks (WANs), metro-area networks (MANs), switch-to-switch and switch-to-server links is often insufficient for demanding applications such as streaming audio or video, high-volume data transfers, data mining applications, high-resolution imaging, interconnection of remote networks and other applications. A cost-effective solution may include spreading data connections over multiple physical links. By scheduling connections or striping data over many physical links (e.g., a multi-link trunk or bundle), or by possibly breaking packets into fragments, it is possible to present a single logical channel with increased available bandwidth.

Thus, multi-link trunking may involve a method for combining multiple physical network links into a single logical link for increased performance. A link or channel may include a logical bandwidth pipe at either a physical, data link, network, or transport layer. Multi-link trunking may include link aggregation, multi-path trunking, parallel path trunking, and port aggregation.

FIG. 1 is an example of a multi-link trunking system 100, in accordance with the present invention. Clients 110 and 112 may be connected via one or more switches 120 and 122. Switches 120 and 122 may be connected by multi-link trunk 134. Clients 110 and 112 may be connected to server 130 via multi-link trunk 132.

In a proposed algorithm of the present invention, each new flow (e.g., TCP connection) may be intelligently assigned to a link (to avoid mis-ordering of packets) wherein system throughput and delay may be optimized. In other words, the present invention adapts to a system load and makes an optimal decision as to which link a flow should be assigned thereby compensating for excess traffic on one link and adjusting to favor a least loaded link.

Figure 2:
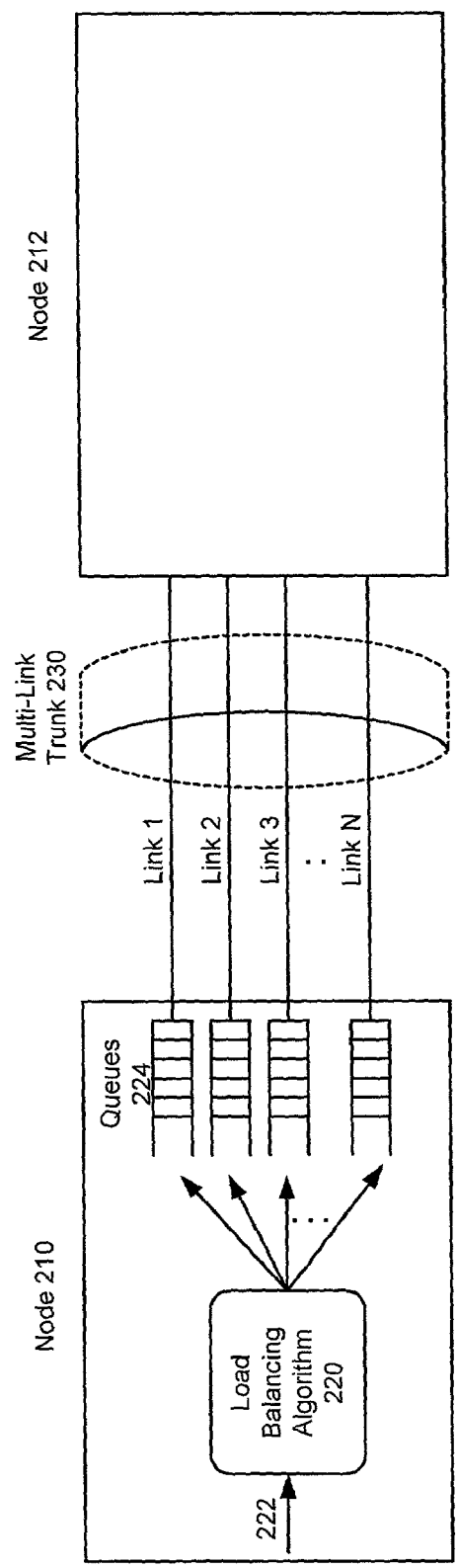
FIG. 2 is an example of a multi-link trunking scheme in accordance with the present invention.

FIG. 2 is an example of a multi-link trunking scheme in accordance with the present invention. The multi-link trunking scheme of FIG. 2 includes a load balancing algorithm. There are N links in a multi-link trunk 230 between a sending node 210 and a receiving node 212. Node 210 implements the load balancing algorithm 220 and assigns each new flow 222 to a link (e.g., link 1, . . . link N) via queues 224.

Figure 3:
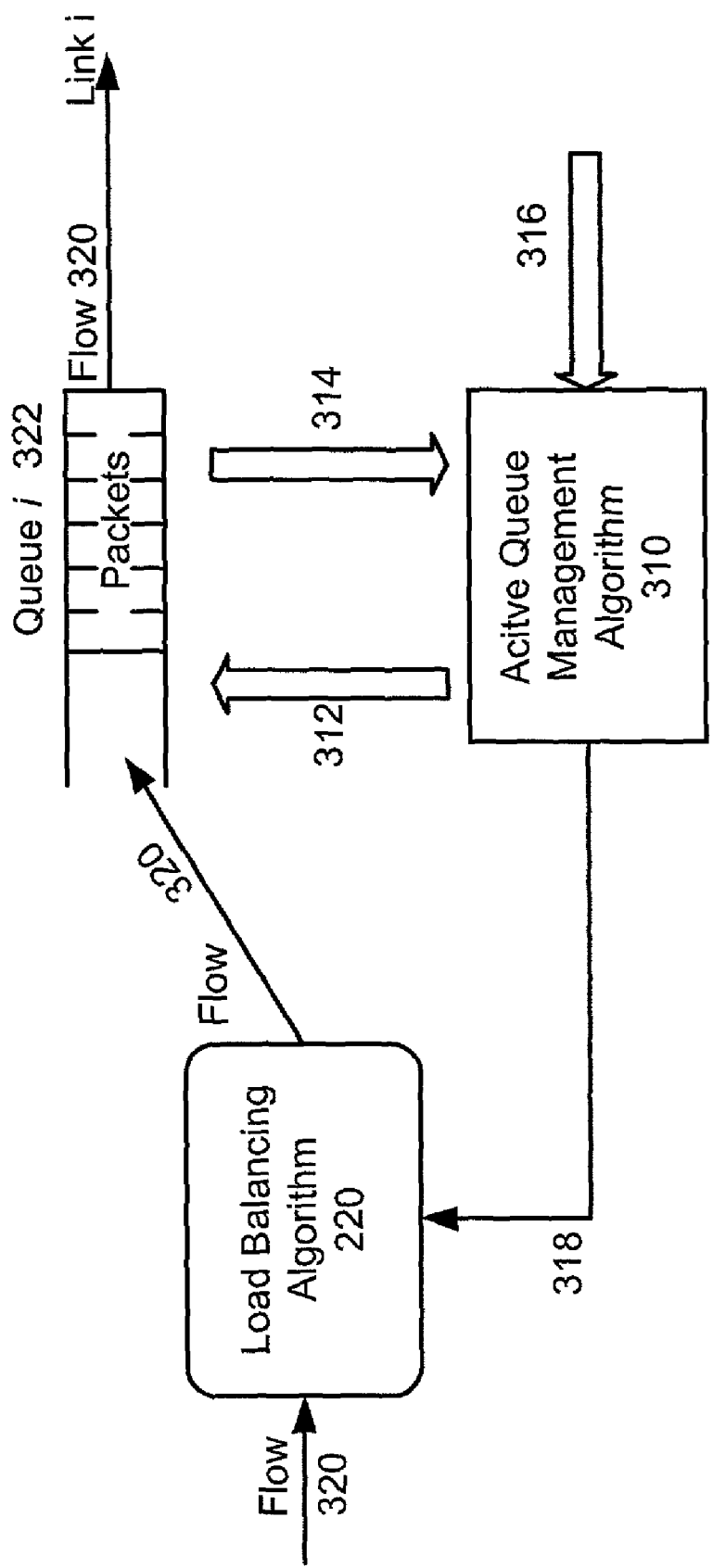
FIG. 3 is an example of a link control architecture in accordance with the present invention.

FIG. 3 is an example of a link control architecture in accordance with the present invention. Inputs to load balancing algorithm 220 may include packet drop probabilities of each queue i. Load balancing algorithm 220 may direct a flow 320 to an appropriate queue i 322. Packet drop probabilities (e.g., link quality metrics) 318 may be computed by an active queue management algorithm 310 which may use random early detection to manage queue sizes. Active queue management algorithm 310 may receive control parameters 316 and queue size 314 to generate packet drop probabilities which are then forwarded to load balancing algorithm 220. Packet drop decisions 312 may be forwarded to queue i 322 from active queue management algorithm 310. Queue i 322 may direct flow 320 to link i, as determined by load balancing algorithm 220.

For example, the particular active queue management algorithm 310 used in the load balancing scheme may involve the algorithm described in U.S. patent application Ser. No. 09/455,445 filed Dec. 6, 1999. This algorithm may be capable of stabilizing a network queue at a level independent of traffic load thereby providing more predictable maximum queuing delays and improved link utilization.

Figure 4:
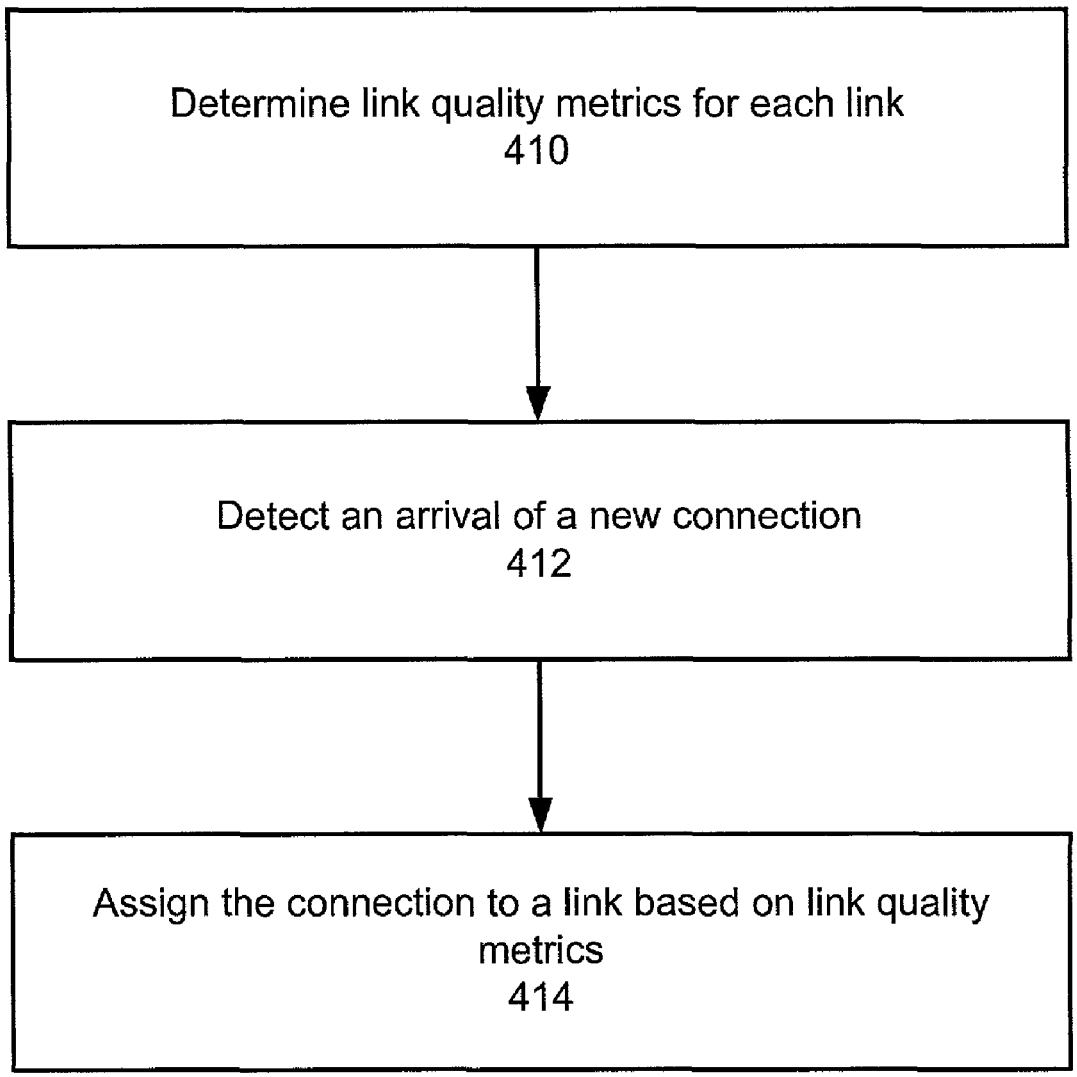
FIG. 4 is a flowchart illustrating an adaptive load balancing algorithm in accordance with the present invention.

FIG. 4 is a flowchart illustrating an adaptive load balancing algorithm in accordance with the present invention. At step 410, link quality metrics for each link may be determined. At step 412, an arrival of a new connection may be detected. At step 414, the connection may be assigned to an appropriate link based on previously determined link quality metrics. Link quality metrics may further include an amount of loss experienced by each link and availability values of each link of a trunk. The algorithm of the present invention provides probabilistic, rather than deterministic load balancing.

The algorithm of the present invention may be designed to balance the number of TCP connections such that an amount of data sent over each link is proportional to its capacity (e.g., bandwidth plus buffering) even if the links have unequal capacities. In addition, the present invention may balance loss rates on the links. As loss rates depend on the number of connections, balancing loss rates involves balancing the number of connections. Further, the algorithm of the present invention attempts to fully utilize most or all links. Consequently, instances where some links become saturated while others are underutilized should be minimized.

Figure 5:
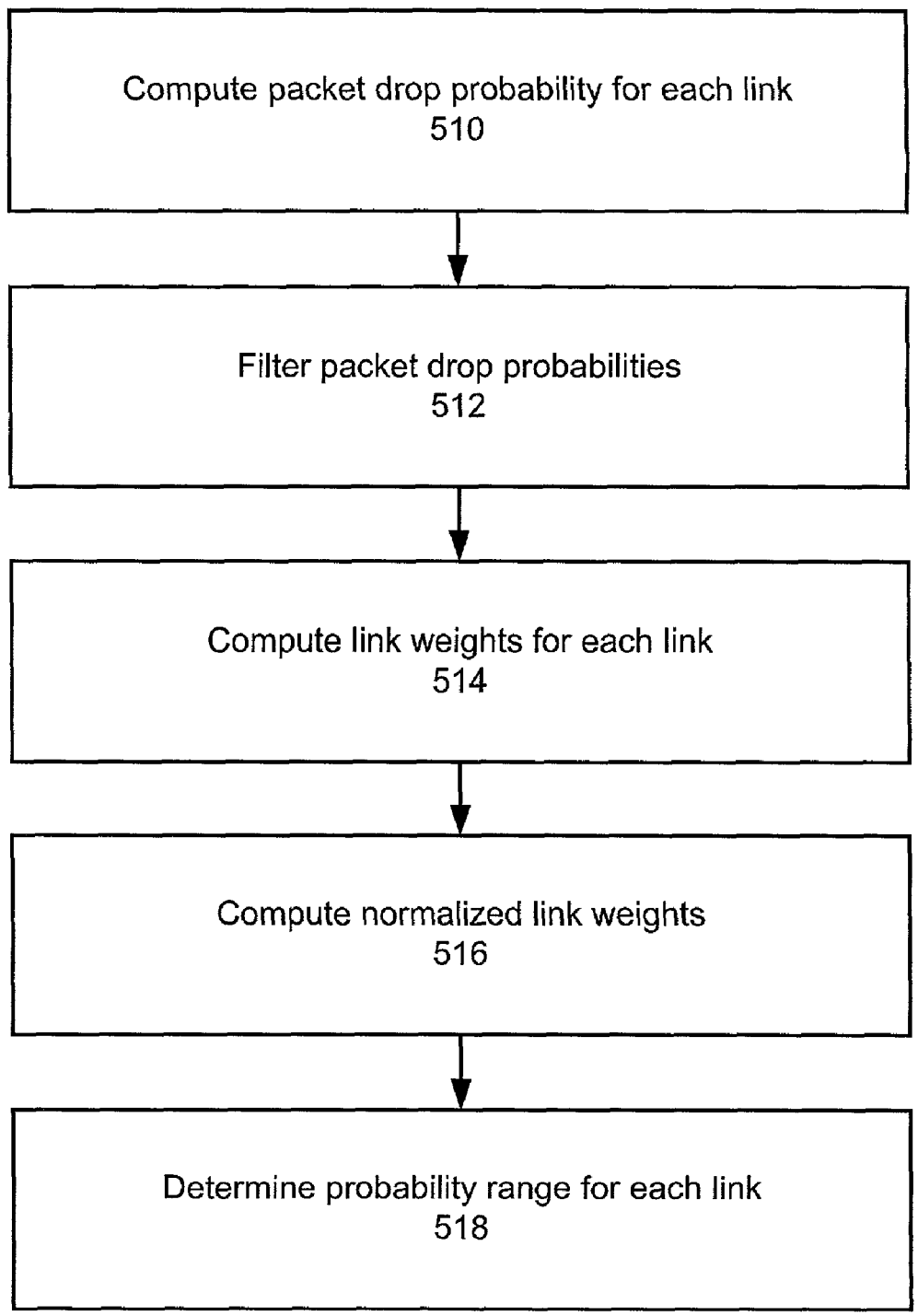
FIG. 5 is a flowchart illustrating details of an adaptive load balancing algorithm in accordance with the present invention.

FIG. 5 is a flowchart illustrating details of an adaptive load balancing algorithm in accordance with the present invention. In particular, a load balancing algorithm of the present invention is described in FIG. 5. At every discrete time step n, where $n=1\Delta t, 2\Delta t, 3\Delta t, \ldots$, and $\Delta t$ represents a sampling interval in seconds (which may be selected in relation to the link capacity), the steps of FIG. 5 may be performed.

At step 510, packet drop probabilities $p_{d,i}(n) \in [0,1]$ for each link $i=1, 2, \ldots, N$ may be computed. At step 512, packet drop probabilities may be filtered, as shown by $\hat{p}_{d,i}(n)=(1-\eta)\hat{p}_{d,i}(n-1)+\eta p_{d,i}(n)$, $0<\eta<1$. At step 514, link weights may be computed for each link, as shown by $w_i(n)=1-\hat{p}_{d,i}(n)$, $i=1, 2, \ldots, N$. At step 516, normalized link weights may be computed, as shown by $$g_l(n) = \frac{w_l(n)}{\sum_{j=1}^{N} w_j(n)},$$

$i=1, 2, \ldots, N$. At step 518, probability ranges for each link may be determined as follows:

Link 1: $[0, g_1(n)]$

Link 2: $(g_1(n), g_1(n)+g_2(n)]$ $$\text{Link } i: \left( \sum_{k=0}^{i-1} g_k(n), \sum_{k=0}^{i} g_k(n) \right], \quad i=2, \ldots, N,$$

$$g_0(n) = 0, \quad \sum_{k=0}^{N} g_k(n) = 1$$

Figure 6:
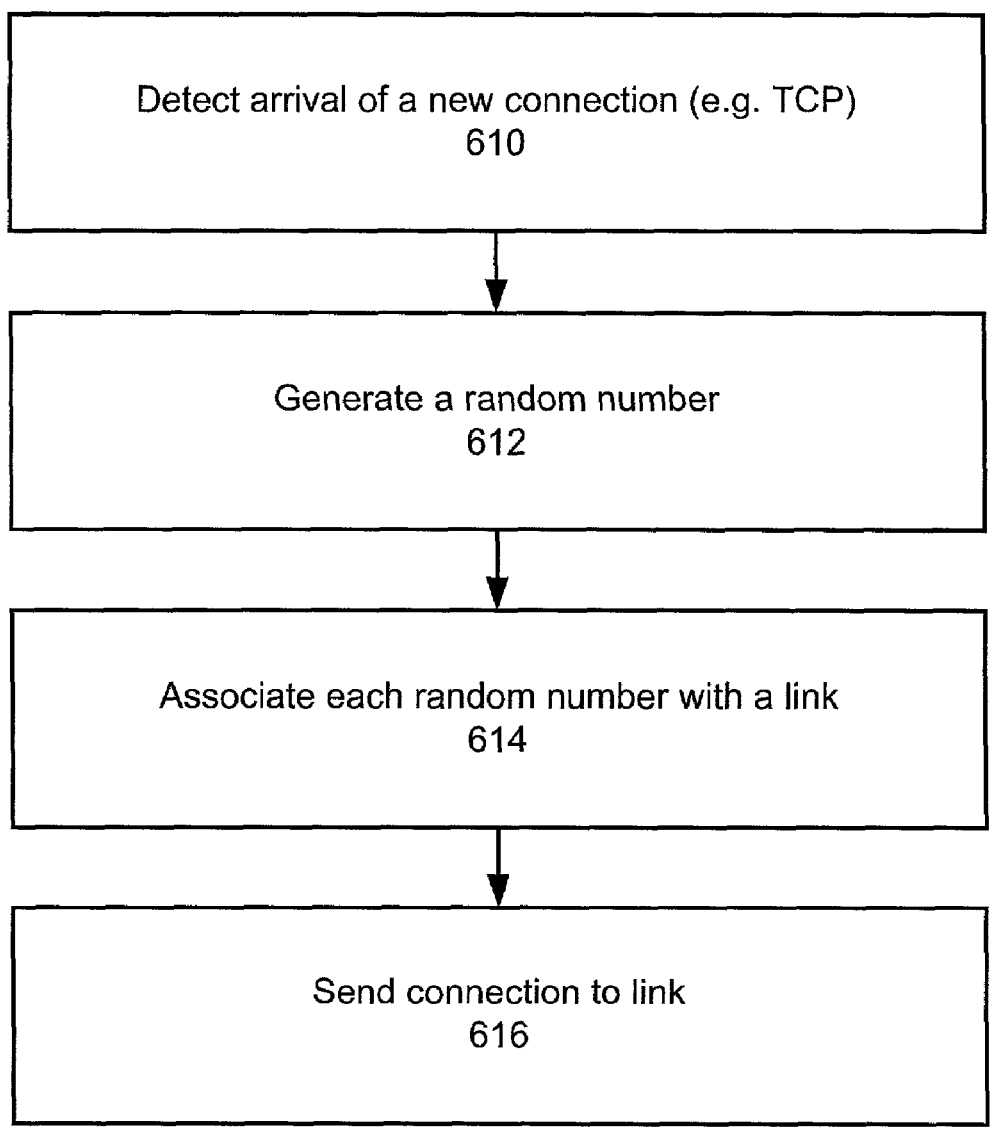
FIG. 6 is a flowchart illustrating a process for scheduling TCP connections in accordance with the present invention.

FIG. 6 is a flowchart illustrating a process for scheduling TCP connections in accordance with the present invention. At step 610, an arrival of a new connection (e.g., TCP) may be detected. At step 612, a random number may be generated, as shown by $p_{rand} \in [0,1]$. At step 614, each random number may be associated with a link i. At step 616, a connection may be sent to link i. If $$\sum_{k=0}^{i-1} g_k(n) < p_{rand} \leq \sum_{k=0}^{i} g_k(n)$$

for $i=2, \ldots, N$, or $0 \leq p_{rand} \leq g_1(n)$ for $i=1$, a TCP connection is sent to link i.

According to another embodiment, computation of the packet drop probabilities may involve an active queue management algorithm that uses a feedback control approach to randomly discard packets with a load-dependent probability when a buffer in a network node gets congested. An average queue size may be maintained close to a predetermined threshold where transient traffic bursts may be queued without unnecessary packet drops. Packet drop probability computations may be implemented in the active queue management algorithm of the present invention.

An active queue management algorithm provides a mechanism for congestion control (e.g., controlling the queue size) at a line interface of a network node. The algorithm controls congestion by randomly dropping packets with a probability $p_d$, which constitute a signal to applications (e.g., TCP sources) to reduce sending rate. The algorithm takes its decision of dropping or accepting an incoming packet so that the queue occupancy level is kept at a given target level, thereby reducing buffer underflow and overflow.

An actual queue size on a link i may be sampled every $\Delta t$ units of time (e.g., seconds). The active queue management algorithm may provide a new value of the drop probability $p_{d,i}$ every $\Delta t$ units of time. Therefore, $\Delta t$ may represent a sampling/control interval of the system.

A variable $q_i(n)$ may denote an actual queue size and $T_i(n)$ may represent a target buffer occupancy (which may be fixed if desired) on a link i, $i=1, 2, \ldots, N$, at discrete time n, where $n=1\Delta t, 2\Delta t, 3\Delta t, \ldots$. A drop probability $p_{d,i}$ which may drive the queue size to this target buffer occupancy may be determined. Thus, $p_{d,i}$ may be adapted to react to actual queue dynamics experienced at a node using a control mechanism. For example, if an actual queue size $q_i$ is smaller than a target queue size $T_i$, $p_{d,i}$ may be decreased to make an aggressive usage of available resources, and vice versa if the actual queue size is higher.

Therefore, a controller may adapt $p_{d,i}$ so that a magnitude of an error signal, as shown by $$e_i(n)=q_i(n)-T_i(n)$$

may be kept small. Due to the burstiness (i.e., randomness in the generation and transport) of network traffic and other perturbations, the error signal may fluctuate highly, so that some low pass filtering may be desirable.

A first part of the controller may involve a discrete-time first-order low-pass filter (an exponentially weighted moving average filter, EWMA) with gain $0<\beta<1$. The filtered error signal may be defined as $$\hat{e}_i = (1-\beta)\hat{e}_i(n-1)+\beta e_i(n),$$

A second part of the controller may involve an incremental adaptation of a drop probability $p_{d,i}$ proportional to the filtered error signal, as shown by $$p_{d,i}(n)=p_{d,i}(n-1)+\alpha \hat{e}_i(n),$$

where α is a control gain. In another example, $p_{d,i}(n)$ may be bounded by $0 \leq p_{d,i}(n) \leq 1$, for some or all n. A basic recursion $p_{d,i}(n) = p_{d,i}(n-1) + \alpha e_i(n)$ may implement a standard summation or integral control scheme since $\Delta p_{d,i}(n) = p_{d,i}(n) - p_{d,i}(n-1) = \alpha e_i(n)$ or $p_{d,i}(n) = \alpha \Sigma_{k=0}^{n} e_i(k)$, in discrete-time (and $dp_{d,i}(t)/dt = \alpha e_i(t)$ or $p_{d,i}(t) = \alpha \int_0^t e_i(\tau) d\tau$, in continuous-time).

For example, a normalized error signal may be used instead, resulting in a control equation defined as $$p_{d,l}(n) = p_{d,l}(n-1) + \alpha \frac{\hat{e}_l(n)}{2T_l(n)},$$

where the term $2T_i(n)$ serves as a normalization parameter.

Filtering error signal $e_i(n)$ may be equivalent to filtering a sampled queue size $q_i(n)$ for constant $T_i$, therefore, a control equation may also be expressed as $$p_{d,l}(n) = p_{d,l}(n-1) + \alpha \left[ \frac{\hat{q}_l(n) - T_l}{2T_l} \right],$$

where $\hat{q}_i(n)$ may denote a filtered queue size. Filtering of error signal $e_i$ or queue size $q_i$ may also have a benefit of allowing traffic bursts to be queued without being unnecessarily discarded. This is because congestion may be detected by comparing an average queue size to a pre-determined threshold. In effect, the average queue size may be controlled thereby allowing transient traffic bursts to be accommodated in the queue.

Figure 7:
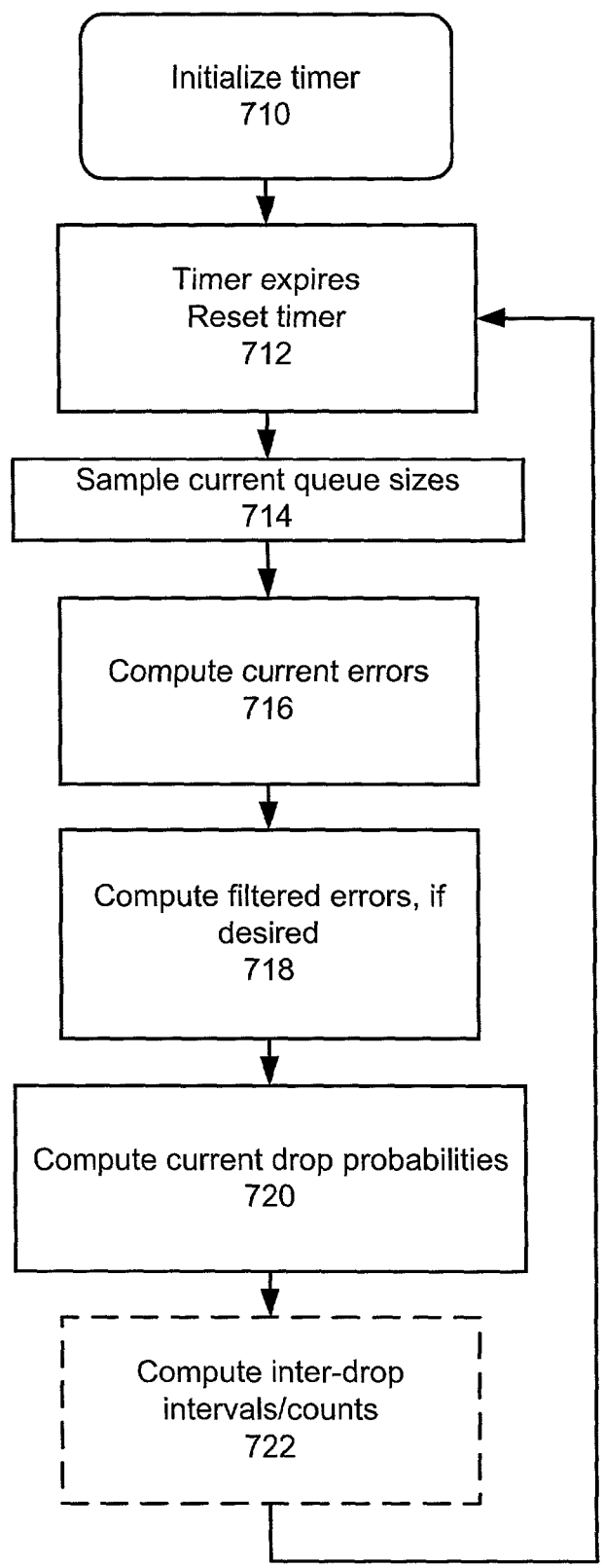
FIG. 7 is a flowchart illustrating a process for computing packet drop probability in accordance with the present invention.

FIG. 7 is a flowchart illustrating a process involved in the active queue management algorithm for computing packet drop probability in accordance with the present invention. This figure also includes a computation of the inter-drop intervals/counts, described in further detail below, if this drop technique is adopted at the queue.

At step 710, a timer may be initialized to a value, such as $\Delta t$, wherein n=0. In addition, $p_{d,i}(n)$ and $e_i(n)$ may be initialized i=1, 2, . . . . N. At step 712, when the timer expires, the timer may be reset to $\Delta t$ wherein n=n+1. Current queue sizes: $q_i(n)$, i=1, 2, . . . , N may be sampled, at step 714. At step 716, current errors may be computed using current thresholds $T_i(n)$: $e_i(n) = q_i(n) - T_i(n)$, i=1, 2, . . . , N. At step 718, filtered errors $\hat{e}_i(n) = (1-\beta)\hat{e}_i(n-1) + \beta e_i(n)$, i=1, 2, . . . , N may be computed, if so desired. At step 720, current drop probabilities $$p_{d,l}(n) = \min\left\{\max\left[p_{d,l}(n-1) + \alpha \frac{\hat{e}_l(n)}{2T_l(n)}, 0\right], \theta_l\right\},$$

i=1, 2, . . . , N may be computed. An upper bound on the drop probabilities may also be introduced by selecting appropriate limits $\theta_i \leq 1$. Then, $p_{d,i}(n)$, i=1, 2, . . . , N, may be used as the packet drop probabilities until time n+1, when new $p_{d,i}$ values are to be computed again. Finally, $\hat{e}_i(n)$ and $p_{d,i}(n)$ values may be stored to be used at time n+1.

At step 722, inter-drop intervals/counts may be computed if a particular drop technique is being used.

Parameters affecting control performance may include a combination of sampling interval, control gain, filter gains, control target, no drop threshold. Sampling interval ($\Delta t$) may include a time interval for taking measurements and applying the computed $p_{d,i}$, e.g., $\Delta t = 10$ packet transmission time Control gain (α) may control reaction speed and stability of the control system. A recommended value when measurements are done on a packet by packet basis is α=0.00005, for example. Filter gains (β) may control reaction speed of the filter. A recommended value is β=0.002, for example. Control target ($T_i$, i=1, 2, . . . , N) may be implemented to set an average buffer utilization level and average queuing delay on link i, since the average queue size evolves around this value. A buffer size $B_i$ may be allocated to connections and/or flows anticipated in a link i. "No-drop" threshold ($L_i$, i=1, 2, . . . , N) may include a queue threshold lower than $T_i$, below wherein no packets are dropped even though $p_{d,i}$ may be greater than zero. This helps to maintain high link utilization and maintain an average queue size around a target level. $L_i$ may be set at a lower than $T_i$, i.e., $L_i = bT_i$, $b \in [0.8, 0.9]$. A recommended value is $L_1 = 0.97_i$, for example.

Figure 8:
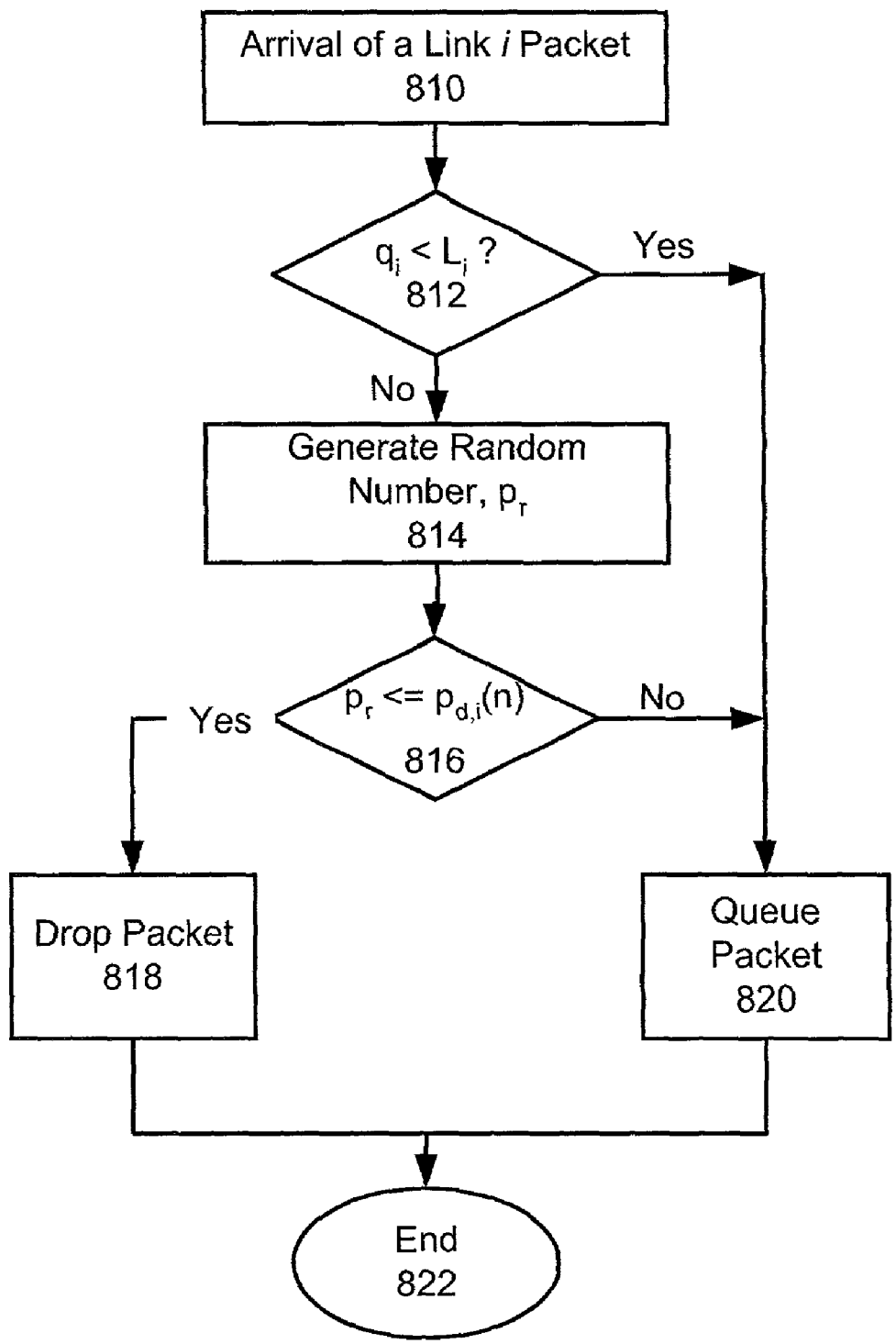
FIG. 8 is a flowchart illustrating a process for dropping packets using a random number generator in accordance with the present invention.

FIG. 8 is a flowchart illustrating a process involved in the active queue management algorithm for dropping packets using a random number generator in accordance with the present invention. A mechanism for dropping packets at a link queue i, i=1, 2, . . . , N, may include using computed packet drop probabilities $p_{d,i}$. A decision to accept or drop an incoming packet in a random number generator approach may be based on the outcome of a comparison of a randomly generated number $p_r \in [0,1]$ and the drop probability $p_{d,i}$, i=1, 2, . . . , N. The procedure may be described as follows:

if $q_i(n) < L_i$, then accept incoming packet
else, if $p_r \in [0,1] \leq p_{d,i}$, then drop packet,
else, accept packet Parameter $L_i$ ($L_i < T_i$) may be introduced in the drop mechanism of the active queue management algorithm to maintain high link utilization and keep the queue size around the target level. A drop mechanism of the present invention may not drop packets when $q_i(n) < L_i$ in order to maintain high resource utilization and also to avoid further penalizing sources which are in the process of backing off in response to (previous) packet drops. This is because a time lag may exist between the time a packet is dropped and the time a source responds to the packet drop. The computation of $p_{d,i}$, however, still continues even if packet dropping is suspended (when $q_i(n) < L_i$.

As shown in FIG. 8, at step 810, an arrival of a link i packet may be detected. At step 812, it may be determined whether queue size $q_i$ is less than $L_i$. If so, packet may be queued at step 820. If queue size $q_i$ is equal to or greater than $L_i$, a random number $p_r$ may be generated at step 814. At step 816, it may be determined whether $p_r$ is less than or equal to packet drop probability $p_{d,i}(n)$. If so, the packet may be dropped, at step 818. If not, the packet may be queued, at step 820. Step 822 represents the end of the process.

Another approach is to implement a simple count mechanism based on drop probability values. The use of a drop probability metric provides an indication of an amount of packets that should be dropped in order to achieve a given loss rate. As a result, an inverse of a drop probability value may be used to indicate an interval in packets until the next packet drop. That is, an inverse of the drop probability provides an inter-drop interval/count.

For example, for a drop probability $p_{d,i}$, i=1, 2, . . . , N, the inter-drop interval/count $D_{I,i}(n) = \lfloor 1/p_{d,i} \rfloor$ where i=1, 2, . . . , N indicates that one out of every $\lfloor 1/p_{d,i} \rfloor$ packets should be dropped.

Thus, a simple implementation of a drop mechanism may include the following:

For each link queue i, initialize count: $count_i = 0$
For each link i packet arrival:
increment count,
if $q_i < L_i$, then queue the incoming packet else, if count$_i$≧D$_{I,i}$, then drop the incoming packet and reset count$_i$=0 else queue the incoming packet

Figure 9:
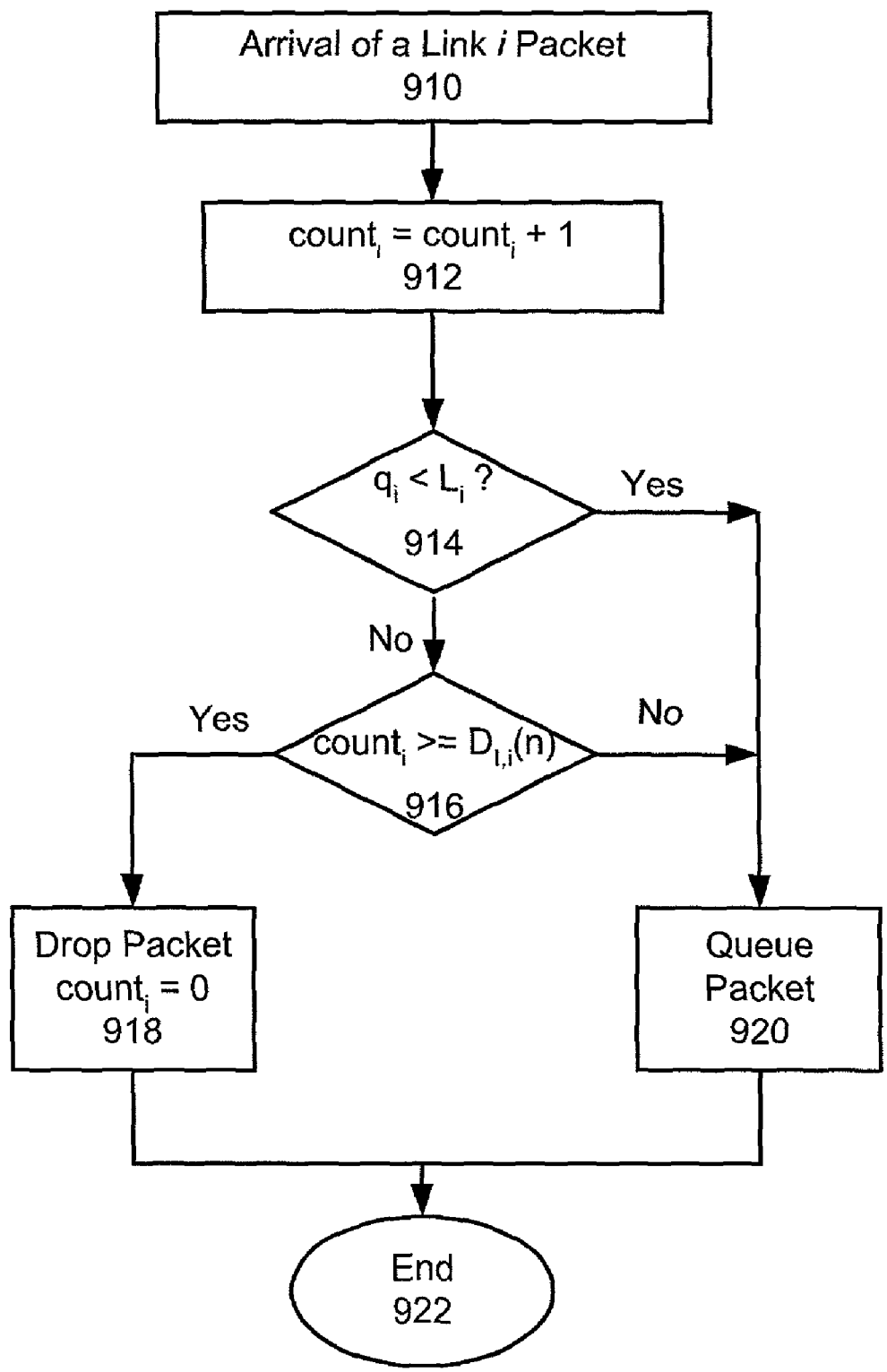
FIG. 9 is a flowchart illustrating a process for dropping packets using an inter-drop interval/count approach in accordance with the present invention.

FIG. 9 is a flowchart illustrating a process involved in the active queue management algorithm for dropping packets using an inter-drop interval/count approach in accordance with the present invention. At step 910, an arrival of a link i packet may be detected. At step 912, count$_i$ may be advanced by 1, or other predetermined amount. The count, is initialized to zero at the beginning of the packet drop process of the active queue management algorithm. At step 914, it may be determined whether queue size q$_i$ is less than L$_i$. If so, packet may be queued at step 920. If count, is greater than or equal to inter-drop interval/count D$_{I,i}$(n) at step 916, then packet may be dropped wherein count$_i$ is set to zero at step 918. If count, is less than inter-drop interval/count D$_{I,i}$(n) at step 916, packet may be queued at 920. Step 922 represents the end of the process.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for adaptively load balancing connections in a multi-link trunk in a network having a plurality of network nodes, the method comprising the steps of:

determining at least one relative link quality metric for each link in the multi-link trunk;

detecting an arrival of a connection at a network node;

determining whether to drop an incoming packet at a link queue; and assigning the connection to a link based on the relative link quality metric of the link;

wherein the step of determining whether to drop an incoming packet at the link queue further comprises the steps of:

computing at least one packet drop probability for each link;

generating a random number for the each link in the multi-link trunk;

comparing the random number to the at least one packet drop probability; and computing an inter-drop interval for determining an interval at which to drop a packet.

2. The method of claim 1, further comprising the step of: filtering the packet drop probability.

3. The method of claim 2, further comprising the step of: computing a link weight for each link.

4. The method of claim 3, further comprising the step of: normalizing each link weight for each link.

5. The method of claim 4, further comprising the step of: determining a probability range for each link.

6. The method of claim 1, wherein the step of assigning the connection to the link comprises the steps of:

associating each random number to a link; and sending the connection to the link.

7. The method of claim 1, wherein the random number is associated with one of a plurality of availability subintervals of availability values.

8. An apparatus for adaptively load balancing connections in a multi-link trunk in a network having a plurality of network nodes, the apparatus comprising:

a queue management algorithm for determining at least one relative link quality metric for each link in the multi-link trunk;

a detector for detecting an arrival of a connection at a network node and determining whether to drop an incoming packet at a link queue; and a load balancing algorithm for assigning the connection to a link based on the relative link quality metric of the link;

wherein the detector further provides for computing at least one packet drop probability for each link; generating a random number for the each link in the multi-link trunk; and comparing the random number to the at least one packet drop probability; and further computes an inter-drop interval for determining an interval at which to drop a packet.

9. The apparatus of claim 8, further comprising:

a filter for filtering the packet drop probability;

a link weight computer for computing a link weight for each link;

a normalizer for normalizing each link weight for each link; and a probability range determinator for determining a probability range for each link.

10. The apparatus of claim 8, further comprising:

an associator for associating each random number to a link; and a sender for sending the connection to the link.

11. The apparatus of claim 8, wherein the random number is associated with one of a plurality of availability subintervals of availability values.

12. At least one non-transitory computer readable storage medium storing a computer program of instructions configured to be readable by at least one processor for instructing the at least one processor to execute a computer process for performing the method as recited in claim 1.

13. An article of manufacture for adaptively load balancing connections in a multi-link trunk in a network having a plurality of network nodes, the article of manufacture comprising:

at least one processor readable storage medium; and instructions stored on the at least one medium;

wherein the instructions are configured to be readable from the at least one medium by at least one processor and thereby cause the at least one processor to operate so as to:

determine at least one relative link quality metric for each link in the multi-link trunk;

detect an arrival of a connection at a network node;

determine whether to drop an incoming packet at a link queue;

compute at least one packet drop probability for each link;

generate a random number for the each link in the multi-link trunk;

compare the random number to the at least one packet drop probability;

assign the connection to a link based on the relative link quality metric of the link; and computing an inter-drop interval for determining an interval at which to drop a packet.

14. The article of manufacture of claim 13, wherein the instructions further cause the at least one processor to operate so as to:

filter the packet drop probability;

compute a link weight for each link;

normalize each link weight for each link; and determine a probability range for each link.

15. The article of manufacture of claim 13, wherein the random number is associated with one of a plurality of availability subintervals of availability values.

* * * * *